United States Patent
King et al.

(10) Patent No.: US 9,755,676 B2
(45) Date of Patent: *Sep. 5, 2017

(54) MOBILE WIRELESS COMMUNICATIONS DEVICE PROVIDING ENHANCED INTERFERENCE MITIGATION FROM WIRELINE TRANSMITTER AND RELATED METHODS

(71) Applicant: BLACKBERRY LIMITED, Waterloo (CA)

(72) Inventors: Brynn King, Guelph (CA); Lizhong Zhu, Waterloo (CA); Mingchang Wang, Waterloo (CA); Michael Stephen Corrigan, Kitchener (CA); Chengzhi Wang, Cupertino, CA (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,028

(22) Filed: Jul. 13, 2016

(65) Prior Publication Data
US 2016/0322994 A1  Nov. 3, 2016

Related U.S. Application Data

(63) Continuation of application No. 14/253,441, filed on Apr. 15, 2014, now Pat. No. 9,413,399.

(51) Int. Cl.
*H04B 1/00* (2006.01)
*H04B 1/44* (2006.01)
(Continued)

(52) U.S. Cl.
CPC .............. *H04B 1/10* (2013.01); *H04B 1/086* (2013.01); *H04B 1/401* (2013.01); *H04B 1/44* (2013.01);
(Continued)

(58) Field of Classification Search
CPC . H04W 72/1215; H04W 88/06; H04W 84/12; H04L 1/0027; H04B 15/02
(Continued)

(56) References Cited

U.S. PATENT DOCUMENTS 7,089,434 B2   8/2006  Kuo et al.
7,212,786 B2   5/2007  Kojima et al.
(Continued)

FOREIGN PATENT DOCUMENTS

WO    2013159312 A1   10/2013

OTHER PUBLICATIONS

Intel White Paper "USB 3.0• Radio Frequency Interference Impact on 2.4 GHz Wireless Devices" Apr. 2012; http:// www.usb.org/developersfwhitepapers/327216.pdf pp. 1-22.

*Primary Examiner* — Edward Urban
*Assistant Examiner* — Ralph H Justus
(74) *Attorney, Agent, or Firm* — Guntin & Gust, PLC; Jay H. Anderson (57) ABSTRACT

A mobile wireless communications device may include a housing, a wireless receiver carried by the housing and configured to receive communication signals over a wireless frequency range, a wireline transmitter carried by the housing and configured to transmit communication signals overlapping in frequency with the wireless frequency range, and a controller carried by the housing and coupled with the wireless receiver and the wireline transmitter. The controller may be configured to determine when the wireless receiver is to begin receiving and, based thereon, switch the wireline transmitter to a suspended communication mode during which transmission is disabled. The controller may also be configured to determine when the wireless receiver has
(Continued)

completed receiving and, based thereon, switch the wireline transmitter to a normal communication mode in which transmission is enabled.

20 Claims, 7 Drawing Sheets

(51) Int. Cl.
| | |
|---|---|
| *H04B 1/10* | (2006.01) |
| *H04W 92/02* | (2009.01) |
| *H04B 15/04* | (2006.01) |
| *H04B 1/08* | (2006.01) |
| *H04B 1/401* | (2015.01) |
| *H04W 16/14* | (2009.01) |
| *H04W 88/06* | (2009.01) |

(52) U.S. Cl.
CPC ............ *H04B 15/04* (2013.01); *H04W 92/02* (2013.01); *H04W 16/14* (2013.01); *H04W 88/06* (2013.01)

(58) Field of Classification Search
USPC .................................................. 455/402, 454
See application file for complete search history.

(56) References Cited

U.S. PATENT DOCUMENTS

| | | | |
|---|---|---|---|
| 9,413,399 B2* | 8/2016 | King | H04B 1/10 |
| 2007/0167144 A1* | 7/2007 | Koga | H04B 3/542 |
| | | | 455/402 |
| 2010/0161842 A1 | 6/2010 | Shan et al. | |
| 2010/0329235 A1 | 12/2010 | Trotter et al. | |
| 2011/0257973 A1* | 10/2011 | Chutorash | G01C 21/3661 |
| | | | 704/235 |
| 2012/0096197 A1* | 4/2012 | Ballot | G06F 1/3209 |
| | | | 710/58 |
| 2013/0109317 A1* | 5/2013 | Kikuchi | H04B 7/24 |
| | | | 455/41.2 |
| 2014/0051485 A1* | 2/2014 | Wang | H04B 7/2656 |
| | | | 455/574 |
| 2014/0241406 A1* | 8/2014 | Yu | H04B 15/02 |
| | | | 375/219 |
| 2014/0254730 A1* | 9/2014 | Kim | H04B 15/00 |
| | | | 375/346 |
| 2014/0256247 A1* | 9/2014 | Wietfeldt | H04W 4/00 |
| | | | 455/39 |
| 2015/0133185 A1* | 5/2015 | Chen | H04W 72/1215 |
| | | | 455/552.1 |
| 2015/0134863 A1* | 5/2015 | Hsieh | H04B 15/04 |
| | | | 710/106 |
| 2015/0249753 A1* | 9/2015 | Sato | H04N 1/00244 |
| | | | 348/207.1 |

* cited by examiner

MOBILE WIRELESS COMMUNICATIONS DEVICE PROVIDING ENHANCED INTERFERENCE MITIGATION FROM WIRELINE TRANSMITTER AND RELATED METHODS

CROSS-REFERENCE TO RELATED APPLICATION

This application is a continuation of U.S. application Ser. No. 14/253,441, filed Apr. 15, 2014, which is incorporated herein by reference in its entirety.

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

In addition to cellular and WLAN communications capabilities, many devices also incorporate additional communications infrastructure for communicating with computers, audio/visual equipment, point-of-sale terminals, etc. Such communications technologies may include near field communication (NFC), Bluetooth, universal serial bus (USB), high-definition multimedia interface (HDMI), etc. With the convergence of multiple communication technologies within relatively small mobile wireless communication device form factors (e.g., smart phones, tablet computers, etc.), it may be desirable to provide enhanced techniques for mitigating against potential interference between the various communication signals.

DETAILED DESCRIPTION

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device may include a housing, a wireless receiver carried by the housing and configured to receive communication signals over a wireless frequency range, a wireline transmitter carried by the housing and configured to transmit communication signals overlapping in frequency with the wireless frequency range, and a controller carried by the housing and coupled with the wireless receiver and the wireline transmitter. The controller may be configured to determine when the wireless receiver is to begin receiving and, based thereon, switch the wireline transmitter to a suspended communication mode during which transmission is disabled. The controller may also be configured to determine when the wireless receiver has completed receiving and, based thereon, switch the wireline transmitter to a normal communication mode in which transmission is enabled.

More particularly, the wireless receiver may be further configured to also receive communication signals over another wireless frequency range that is not overlapping in frequency with the communication signals transmitted from the wireline transmitter, and the controller may be configured to not switch the wireline transmitter to the suspended communication mode when the wireless receiver is to begin receiving communication signals via the other wireless frequency range. By way of example, the wireless receiver may be a cellular receiver, and the wireline transmitter may be a universal serial bus (USB) transmitter.

Furthermore, the controller may include a communications processor coupled with the receiver and the transmitter, and an application processor coupled with the communications processor. More particularly, the communications processor may include a general purpose input/output (GPIO), and the communications processor may be configured to generate a signal on the GPIO when the wireless receiver is to begin receiving. The wireline transmitter may be configured to communicate baseband digital signals, for example.

A related method is for using a mobile wireless communications device, such as the one described briefly above. The method may include determining when the wireless receiver is to begin receiving and, based thereon, switching the wireline transmitter to a suspended communication mode during which transmission is disabled. The method may further include determining when the wireless receiver has completed receiving and, based thereon, switching the wireline transmitter to a normal communication mode in which transmission is enabled.

A related non-transitory computer-readable medium is for a mobile wireless communications device, such as the one described briefly above. The non-transitory computer-readable medium may have computer-executable instructions for causing the mobile wireless communications device to at least: determine when the wireless receiver is to begin receiving and, based thereon, switch the wireline transmitter to a suspended communication mode during which transmission is disabled; and determine when the wireless receiver has completed receiving and, based thereon, switch the wireline transmitter to a normal communication mode in which transmission is enabled.

Figure 1:
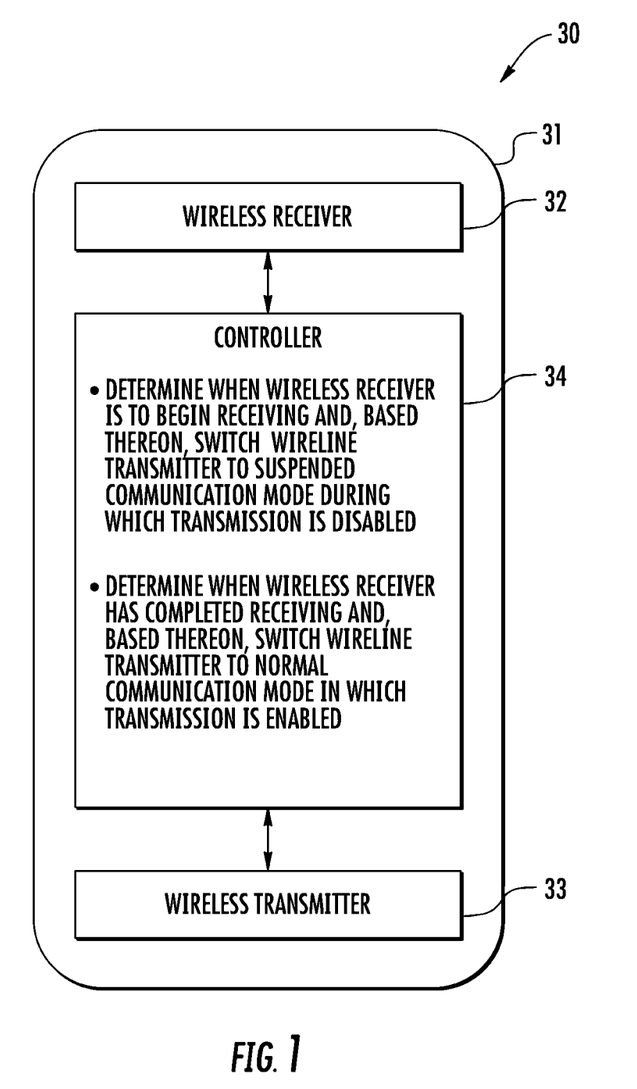
FIG. 1 is a schematic block diagram of a mobile wireless communications device in accordance with an example embodiment.
Figure 2:
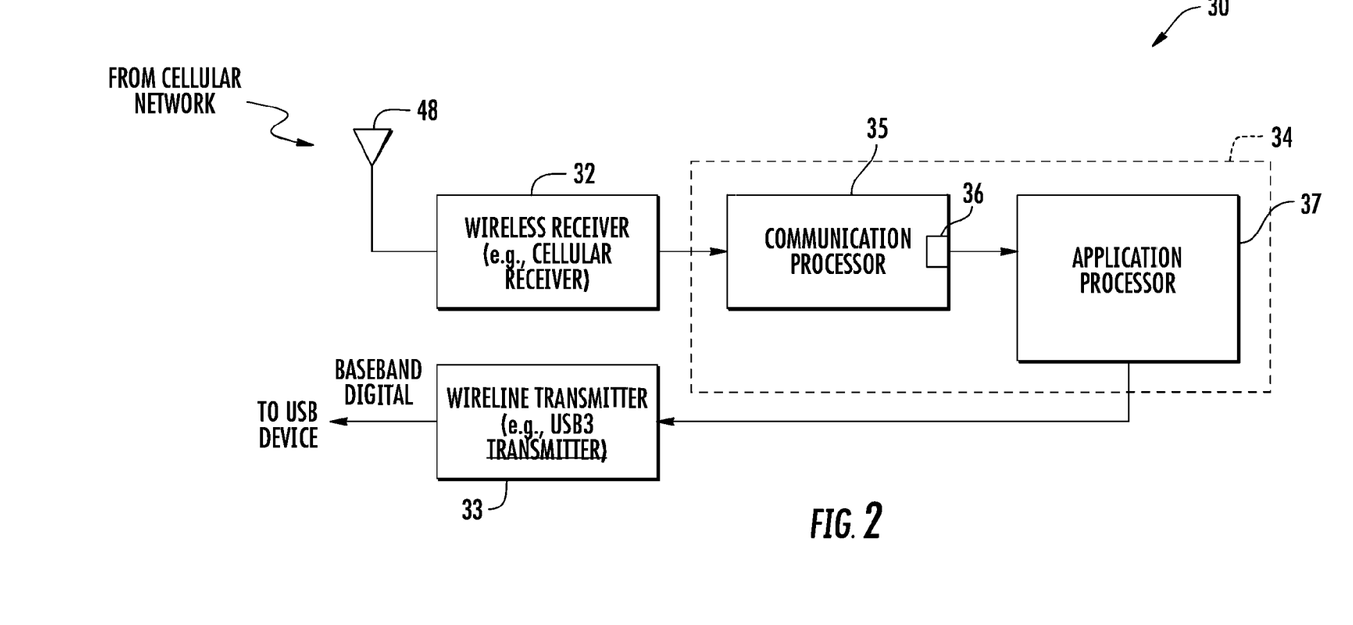
FIG. 2 is a schematic block diagram illustrating components of the mobile wireless communications device of FIG. 1 in accordance with an example embodiment.
Figure 3:
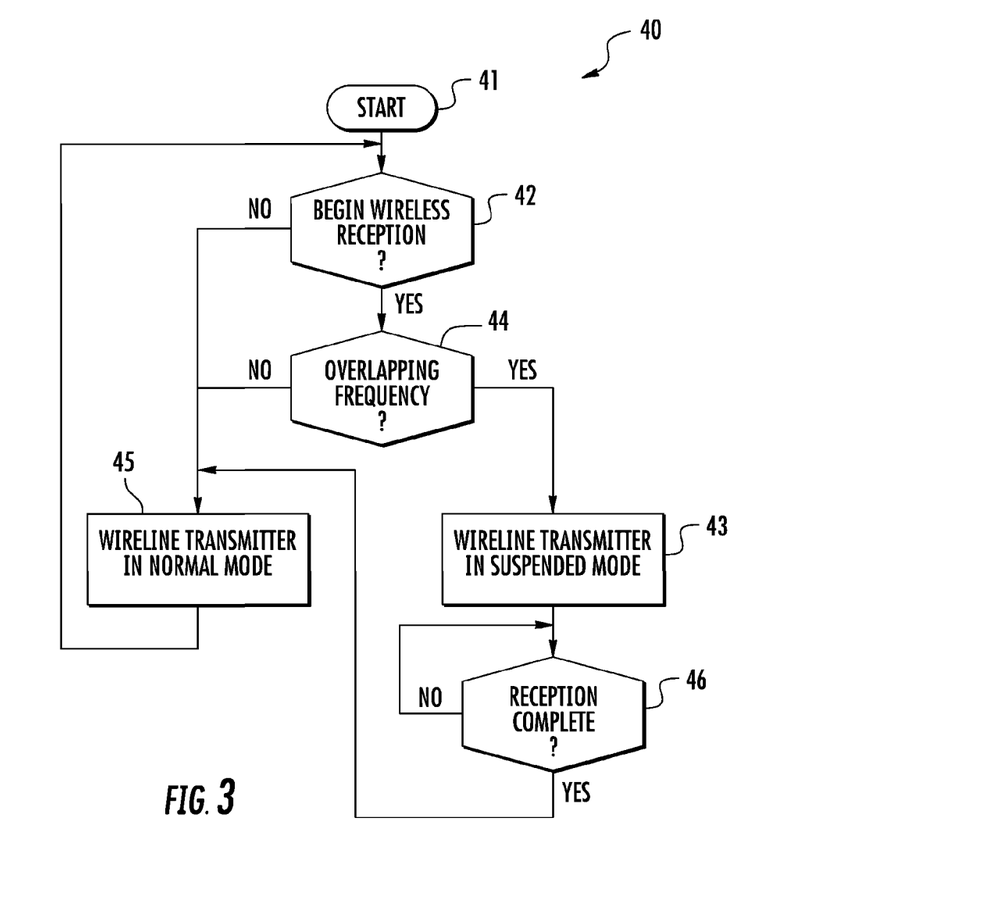
FIG. 3 is a flow diagram illustrating method aspects associated with the mobile wireless communications device of FIG. 1.

Referring initially to FIGS. 1-3, a mobile wireless communications device 30 (also referred to as a "mobile device" herein) and associated method aspects are first described. The mobile device 30 illustratively includes a housing 31, a wireless receiver 32 and associated antenna 48 carried by the housing and configured to receive communication signals over a wireless frequency range or band, a wireline transmitter 33 carried by the housing and configured to transmit communication signals overlapping in frequency with the wireless frequency range, and a controller 34 also carried by the housing and coupled with the wireless receiver and the wireline transmitter.

Example mobile devices 30 may include portable or personal media players (e.g., music or MP3 players, video players, etc.), portable gaming devices, portable or mobile telephones, smart phones, tablet computers, etc. The controller 34 may be implemented using a combination of hardware (e.g., microprocessor, etc.) and a non-transitory computer-readable medium having computer-executable instructions for causing the mobile device 30 to perform various operations, as will be discussed further below.

By way of background, simultaneous use of different communications circuitry in mobile devices may in some instances cause interference between one another. In the example of FIG. 2, the wireless receiver 32 is a cellular receiver, such as a GSM receiver, for example, and the wireline transmitter 33 is a USB3.0 (USB3) transmitter. In this particular example, baseband digital signals transmitted via the USB3 transmitter 33 may overlap with, and accordingly cause interference with, signal reception on certain cellular frequency bands, e.g., GSM/UMTS 700. As a result, this may impact the cellular receiver performance, potentially leading to dropped calls, increased bit error rate, etc.

Figure 5:
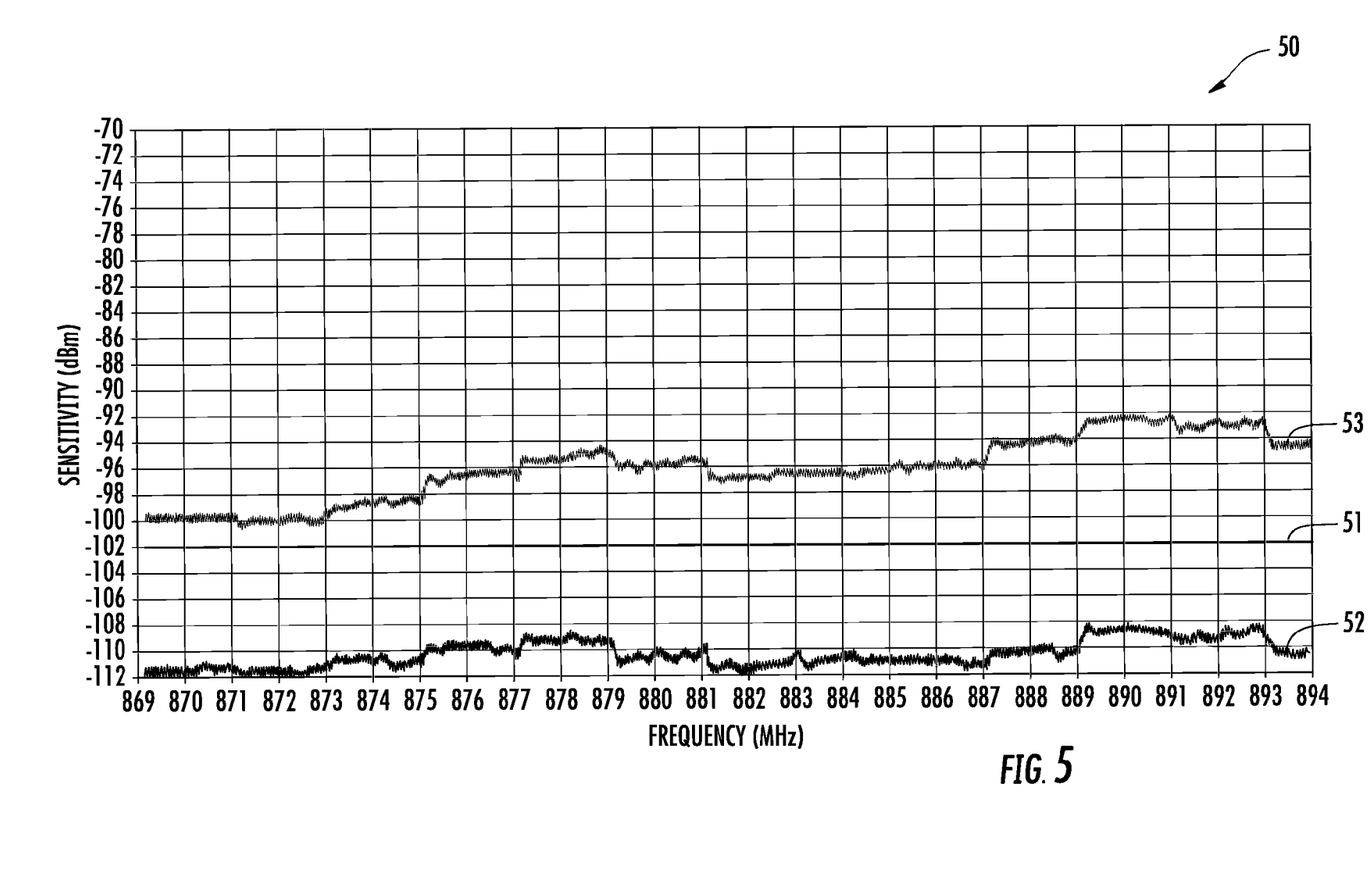
FIG. 5 is a graph illustrating interference effects on cellular signal reception with and without a suspended wireline communication mode.

The effects of such interference will be more fully appreciated with reference to the graph 50 of FIG. 5. The threshold line 51 represents the GSM operational limit for the cellular receiver 32 (−102 bBm in the present example), and the signal plot 52 is for received GSM/UMTS signals with no USB3 device connected to the USB3 transmitter 33 (i.e., the USB3 transmitter is not transmitting). However, once the USB3 transmitter 33 is connected with a USB3 device and begins transmitting baseband digital signals thereto, the resulting signal plot 53 for the cellular receiver 32 suffers from significant interference, causing it to exceed the threshold line 51.

Beginning at Block 41 of the flow diagram 40, in accordance with an example embodiment, the controller 34 may accordingly be configured to determine when the wireless receiver 32 is to begin receiving (Block 42) and, based thereon, switch the wireline transmitter to a suspended communication mode during which transmission is disabled (Block 43). The controller 34 may also be configured to determine when the wireless receiver 32 has completed receiving (Block 46) and, based thereon, switch the wireline transmitter 33 to a normal communication mode in which transmission is enabled, at Block 45.

In some embodiments, a further determination may optionally be made as to whether the reception that is about to begin is in a frequency band that will overlap with the given type of wireline transmission being used (e.g., USB3, etc.), at Block 44. More particularly, the wireless receiver 32 may be further configured to also receive communication signals over another wireless frequency range(s) or band(s) that is not overlapping in frequency with the wireline transmitter 33 (e.g., other GSM/UMTS frequency bands besides GSM 700 in the present example). As such, the controller 34 may be configured to not switch the wireline transmitter 33 to the suspended communication mode when the wireless receiver 32 is to begin receiving communication signals via the other wireless frequency range(s). Similarly, if the wireline transmitter 33 is communicating using another format that does not overlap in frequency with the wireless receiver 32 (e.g., USB2.0 instead of USB3.0), the wireline transmitter may also be allowed to remain in the normal communication mode.

In the example illustrated in FIG. 2, the controller 34 illustratively includes a communications processor 35 including a general purpose input/output (GPIO) 36, and an application processor 37 coupled to the communication processor. By way of example, the communication processor 35 and wireless receiver 32 circuitry may be implemented in a cellular chipset, and the application processor 37 may be a general purpose microcontroller or microprocessor that controls applications running on the mobile device 30 which communicate via the wireless receiver 32 and wireline transmitter 33. The communications processor 35 may be configured to generate an output signal on the GPIO when the wireless receiver 32 is to begin receiving, such as when the wireless receiver receives an indication of an incoming phone call or data message (e.g., email, SMS, etc.) from a cellular network, for example. Although not shown, it should be noted that the mobile device 30 may further include a corresponding wireless transmitter and wireline receiver for the wireless receiver 32 and the wireline transmitter 33, respectively.

Figure 6:
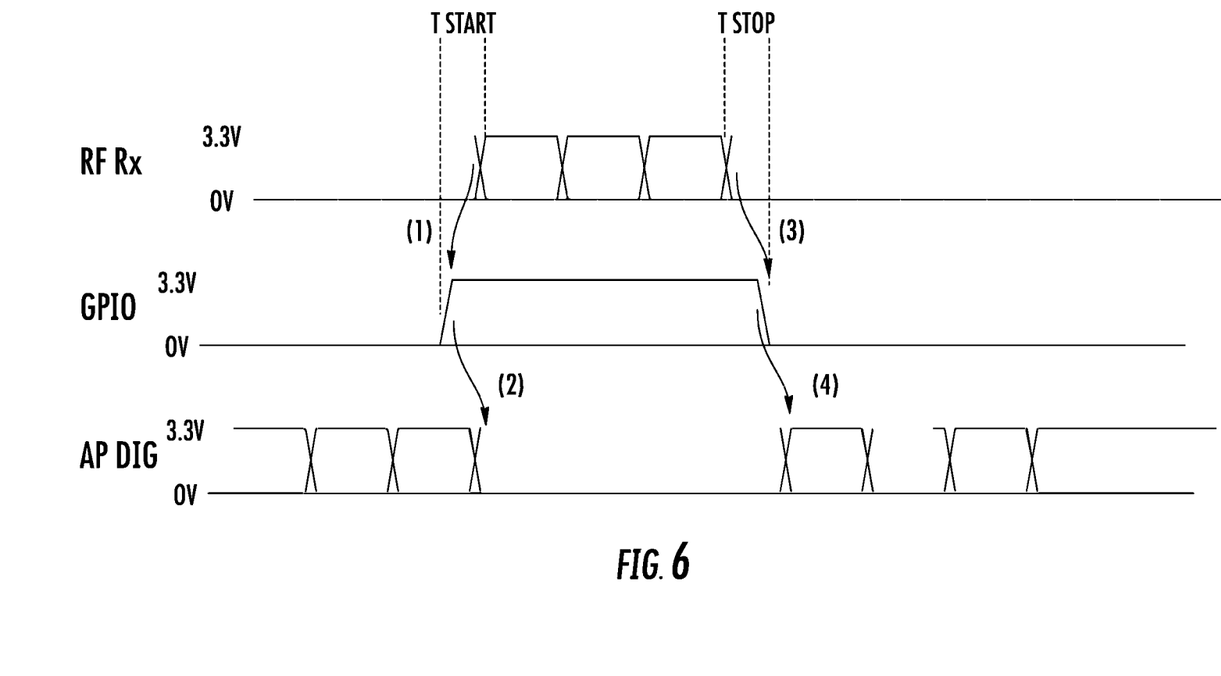
FIG. 6 is a timing diagram illustrating operation of the mobile device of FIG. 2.

Referring additionally to FIG. 6, in accordance with one example implementation, before the wireless receiver 32 starts to receive (indicated by the signal RF Rx in FIG. 6), the communication processor 35 pre-sets the GPIO 36 to logic "high" (time 1) (indicated by the signal GPIO in FIG. 6). There is a time duration (Tstart) from when GPIO is set to logic "high" (time 1) to when the wireless receiver 32 starts receiving (time 2), which may typically be in the micro-second range, for example. Once GPIO goes high, the application processor 37 turns off the digital signal AP DIG (e.g., the USB3 digital baseband signal) within time Tstart. Once reception stops (time 3), the communication processor 35 sets GPIO to logic "low", and there is a time duration (Tstop) from when the wireless receiver 32 stops receiving to when GPIO goes low (time 4), which again will typically be in the micro-second range.

As such, in the present example there will be four operational states. In the first case, when GPIO goes high, if the baseband digital signal is transmitting, the application processor 37 detects the rising edge of GPIO, and it stops the digital signal transmitting in Tstart time (i.e., the wireline transmitter 33 is switched to the suspended communication mode). In the second case, when GPIO goes high, if the baseband digital signal is off, the application processor 37 holds or supports future baseband digital signal transmissions until it detects the falling edge of GPIO. In the third case, when GPIO is low, if the baseband digital signal is on, the application processor 37 keeps sending the baseband digital signal (i.e., the wireline transmitter 33 remains in the normal communication mode). In the forth case, when GPIO is low, if the baseband digital signal is off, the application processor 37 takes no action.

Figure 4:
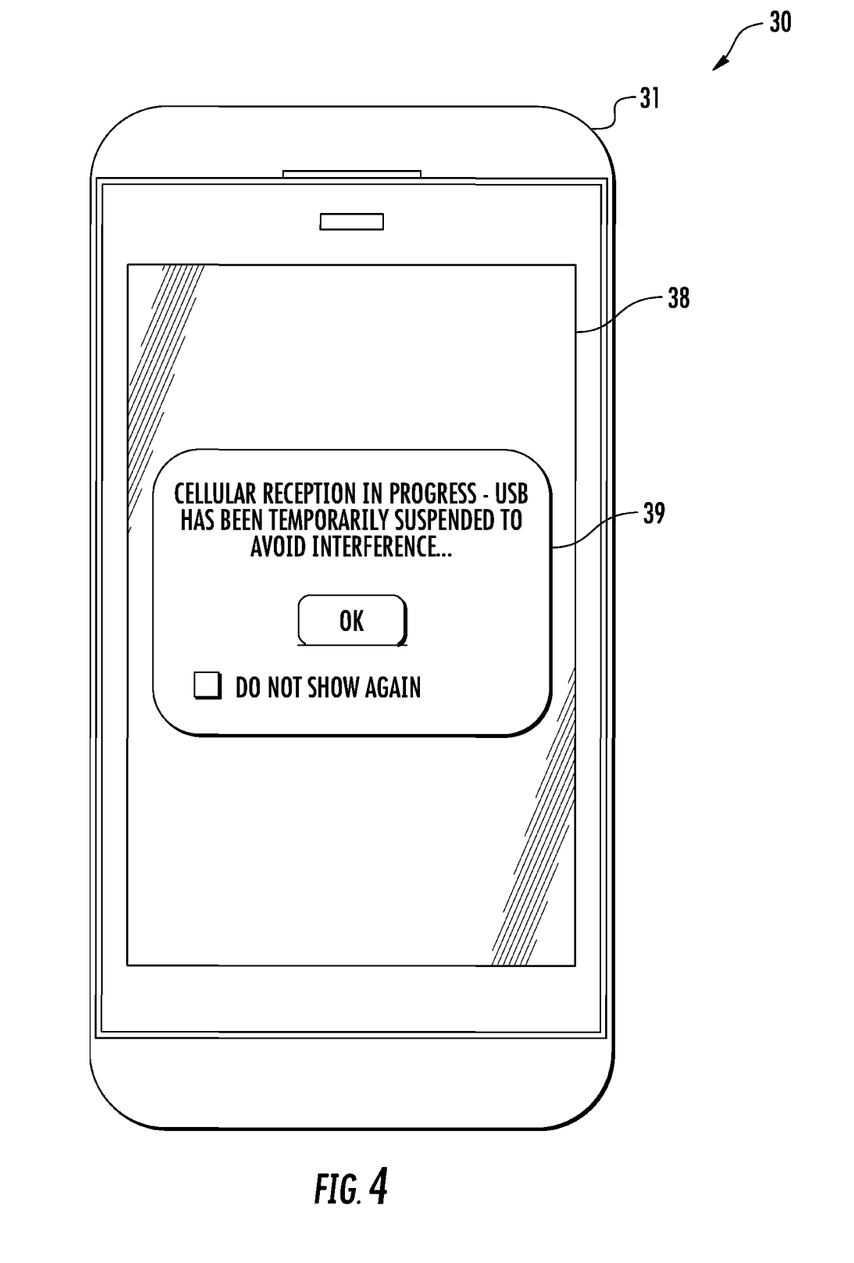
FIG. 4 is a front view of an example implementation of the mobile wireless communications device of FIG. 1 providing a notification of a suspended wireline communication mode.

Turning now to FIG. 4, the application processor 37 may optionally provide a notification to a user when the wireline transmitter 33 is being switched to the suspended communication mode. In the illustrated example, the mobile device 30 is a smart phone in which a display 38 is carried by the housing 31. The application processor 37 in this example causes the display 38 to display a message window 39 indicating that cellular reception is in progress, and that USB communications have been temporarily suspended to avoid interference.

It should be noted that the interference mitigation techniques described herein may be used for other types of communications circuitry besides cellular and USB3, for example. For example, other wireless communications formats may include wireless local area network (WLAN or WiFi), Bluetooth, near field communication (NFC), satellite positioning signals (e.g., GPS), etc. Other types of wireline transceivers 33 may include high-definition multimedia interface (HDMI), FireWire, etc., various combinations of which may cause interference with different wireless formats, for example.

Example components of a mobile communications device 1000 that may be used in accordance with the above-described embodiments are further described below with reference to FIG. 7. The device 1000 illustratively includes a housing 1200, a keyboard or keypad 1400 and an output device 1600. The output device shown is a display 1600, which may include a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 7:
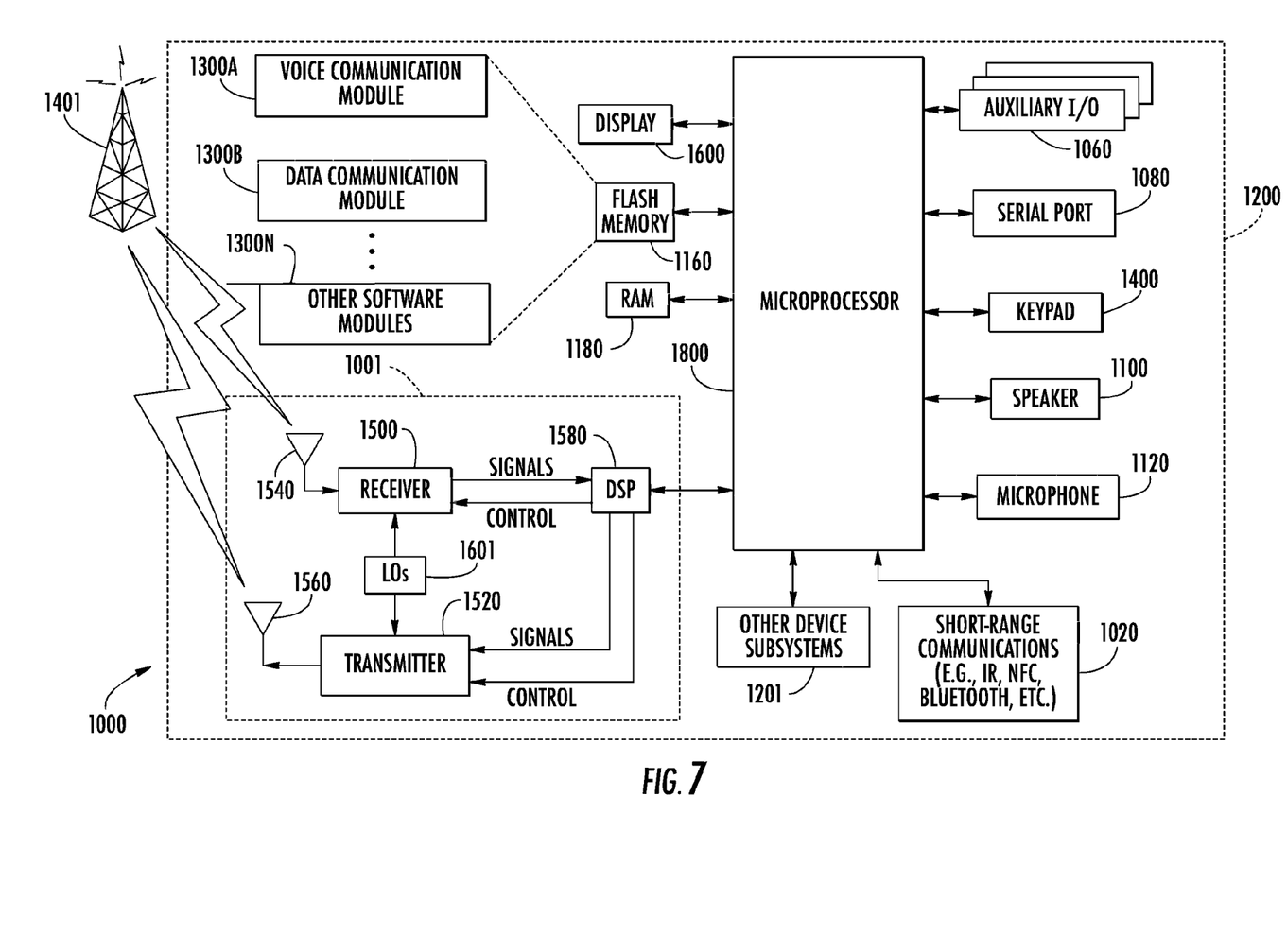
FIG. 7 is a schematic block diagram illustrating example components which may be used with the mobile wireless communications devices of FIGS. 1-2.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may include a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, LTE, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

What is claimed is:

1. A method for using a mobile wireless communications device comprising a wireless receiver configured to receive communication signals over a wireless frequency range, and a wireline transmitter configured to transmit communication signals overlapping in frequency with the wireless frequency range, the method comprising:
   receiving an indication of an incoming communication signal;
   responsive to the indication, determining when the wireless receiver is to begin receiving the communication signal and, prior thereto, generating a first control signal for switching the wireline transmitter to a suspended communication mode during which transmission is disabled; and
   determining when the wireless receiver has completed receiving the communication signal and, subsequent thereto, generating a second control signal for switching the wireline transmitter to a normal communication mode in which transmission is enabled.

2. The method of claim 1, wherein the wireless receiver comprises a cellular receiver.

3. The method of claim 1, wherein the wireline transmitter comprises a universal serial bus (USB) transmitter.

4. The method of claim 1, wherein the wireline transmitter is configured to communicate baseband digital signals.

5. The method of claim 1, further comprising:
   determining a frequency of the incoming communication signal; and
   determining whether the incoming communication signal is in a frequency band overlapping with a type of wireline transmission performed by the wireline transmitter.

6. The method of claim 5, wherein the wireless communications device includes a controller coupled with the wireless receiver and the wireline transmitter for generating the first control signal and the second control signal, wherein the wireless receiver is further configured to also receive communication signals over another wireless frequency range that is not overlapping in frequency with the communication signals transmitted from the wireline transmitter, and wherein the controller is configured to not generate the first control signal when the wireless receiver is to begin receiving communication signals via the other wireless frequency range.

7. The method of claim 6, wherein the controller comprises a communications processor coupled with the wireless receiver and the wireline transmitter, and an application processor coupled with said communications processor.

8. The method of claim 7, wherein the communications processor comprises a general purpose input/output (GPIO); and wherein the communications processor is configured to generate the first control signal on said GPIO.

9. The method of claim 6, wherein the wireline transmitter remains in the normal communication mode when the first control signal is not generated.

10. A method comprising:
    receiving, by a communications device including a wireless receiver and a wireline transmitter, an indication of an incoming communication signal;
    determining whether the incoming communication signal is in a frequency band overlapping with a type of wireline transmission performed by the wireline transmitter;
    responsive to a determination that the incoming communication signal is in the frequency band, determining when the wireless receiver is to begin receiving the incoming communication signal and, prior thereto, generating a first control signal for switching the wireline transmitter to a suspended communication mode during which transmission is disabled; and
    determining when the wireless receiver has completed receiving the communication signal and, subsequent thereto, generating a second control signal for switching the wireline transmitter to a normal communication mode in which transmission is enabled.

11. The method of claim 10, wherein the wireless receiver comprises a cellular receiver.

12. The method of claim 10, wherein the wireline transmitter comprises a universal serial bus (USB) transmitter.

13. The method of claim 10, wherein the wireline transmitter is configured to communicate baseband digital signals.

14. The method of claim 10, wherein the wireline transmitter remains in the normal communication mode in accordance with a determination that the incoming communication signal is not in the frequency band.

15. The method of claim 10, further comprising displaying a message indicating that the wireline transmitter is in the suspended communication mode.

16. A device comprising:
    a wireless receiver configured to receive communication signals over a wireless frequency range;
    a wireline transmitter configured to transmit communication signals overlapping in frequency with the wireless frequency range;
    a controller coupled with the wireless receiver and the wireline transmitter, wherein the controller performs operations comprising:

receiving an indication of an incoming communication signal;

responsive to the indication, determining when the wireless receiver is to begin receiving the communication signal and, prior thereto, generating a first control signal for switching the wireline transmitter to a suspended communication mode during which transmission is disabled and displaying a message indicating that the wireline transmitter is in the suspended communication mode; and determining when the wireless receiver has completed receiving the communication signal and, subsequent thereto, generating a second control signal for switching the wireline transmitter to a normal communication mode in which transmission is enabled.

17. The device of claim 16, wherein the controller comprises a communications processor coupled with the wireless receiver and the wireline transmitter, and an application processor coupled with said communications processor.

18. The device of claim 17, wherein the communications processor comprises a general purpose input/output (GPIO); and wherein the communications processor is configured to generate the first control signal on said GPIO.

19. The device of claim 16, wherein the wireless receiver comprises a cellular receiver.

20. The device of claim 16, wherein the wireline transmitter comprises a universal serial bus (USB) transmitter.

* * * * *